Aug. 21, 1962  R. E. COASH ET AL  3,050,205
LOAD SHIFTING DEVICE

Filed Dec. 30, 1954  6 Sheets-Sheet 1

INVENTORS.
ROBERT E. COASH AND
ALONZO B. KENDALL.
BY Eugene C. Knoblock
ATTORNEY

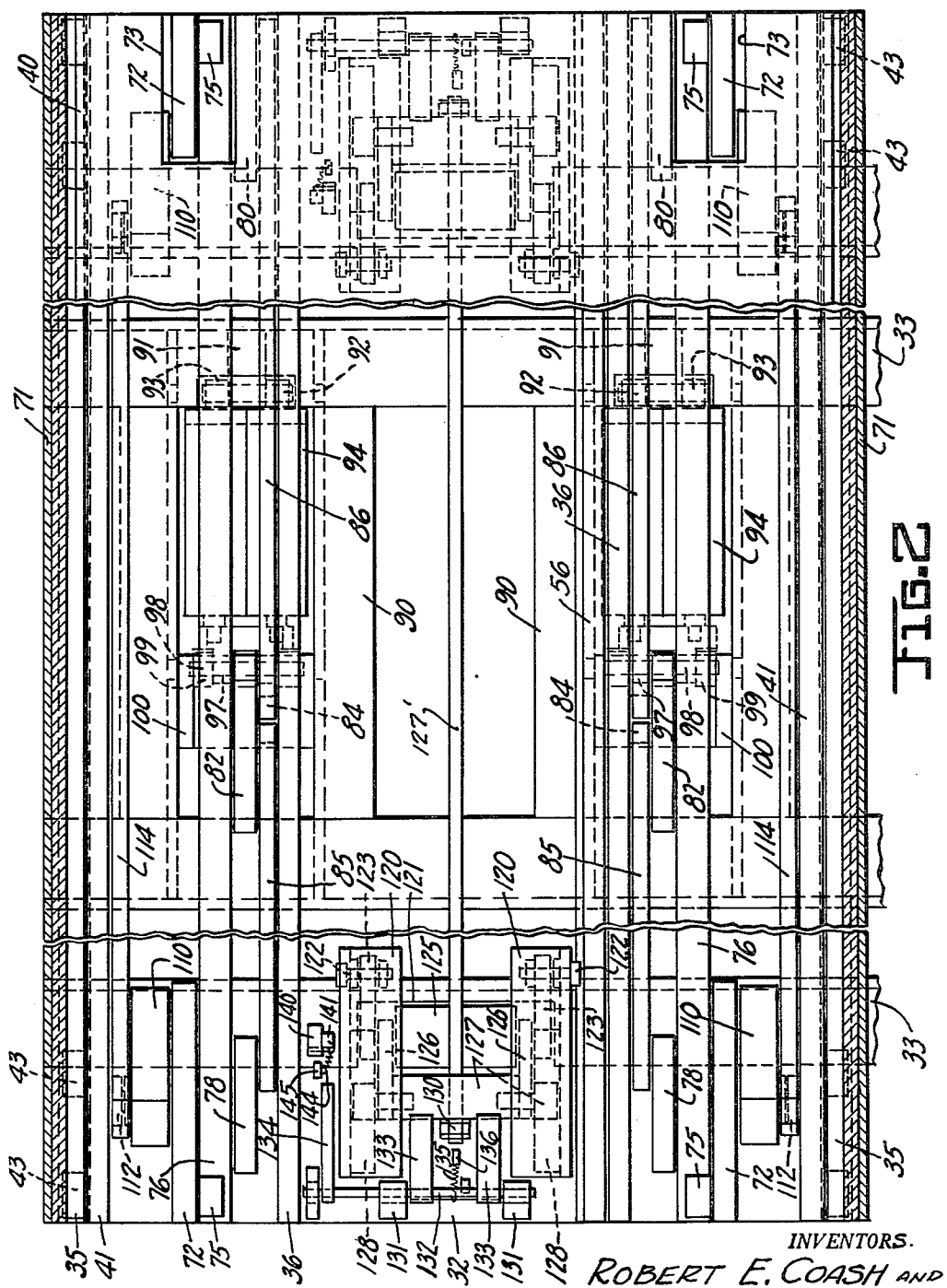

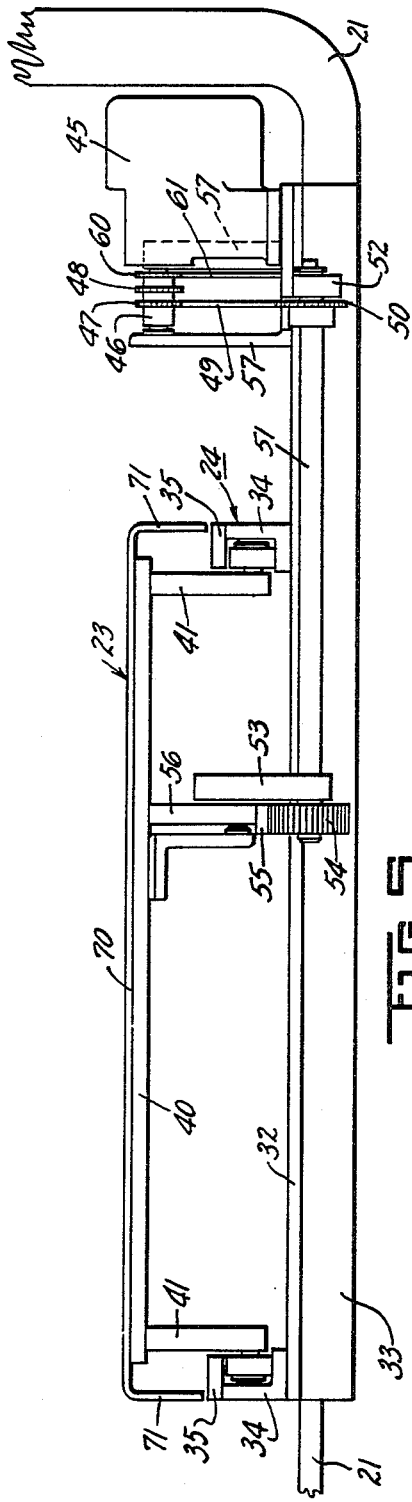

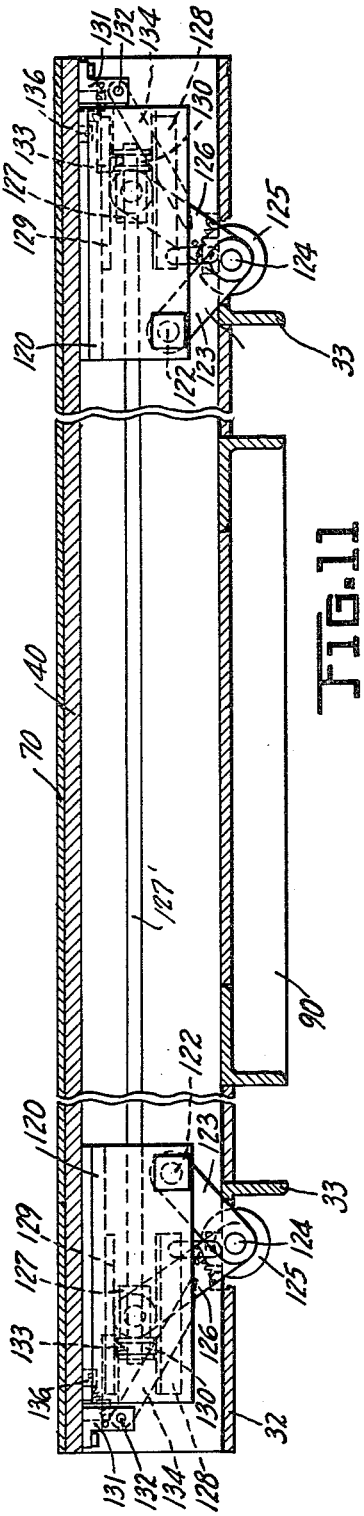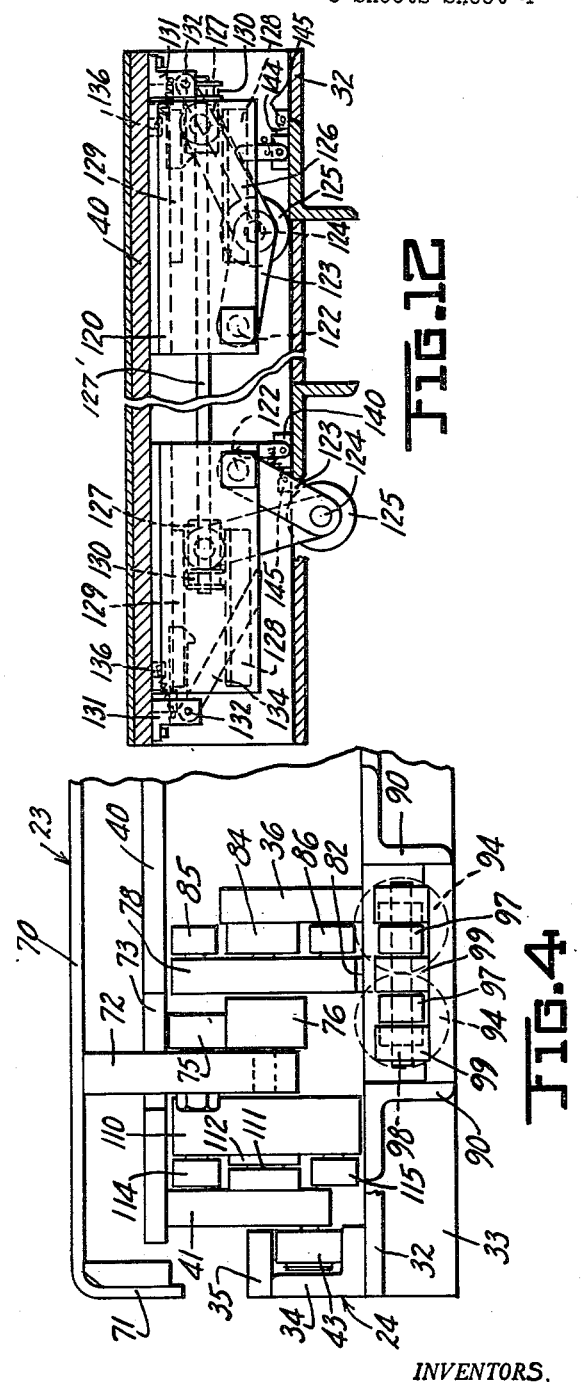

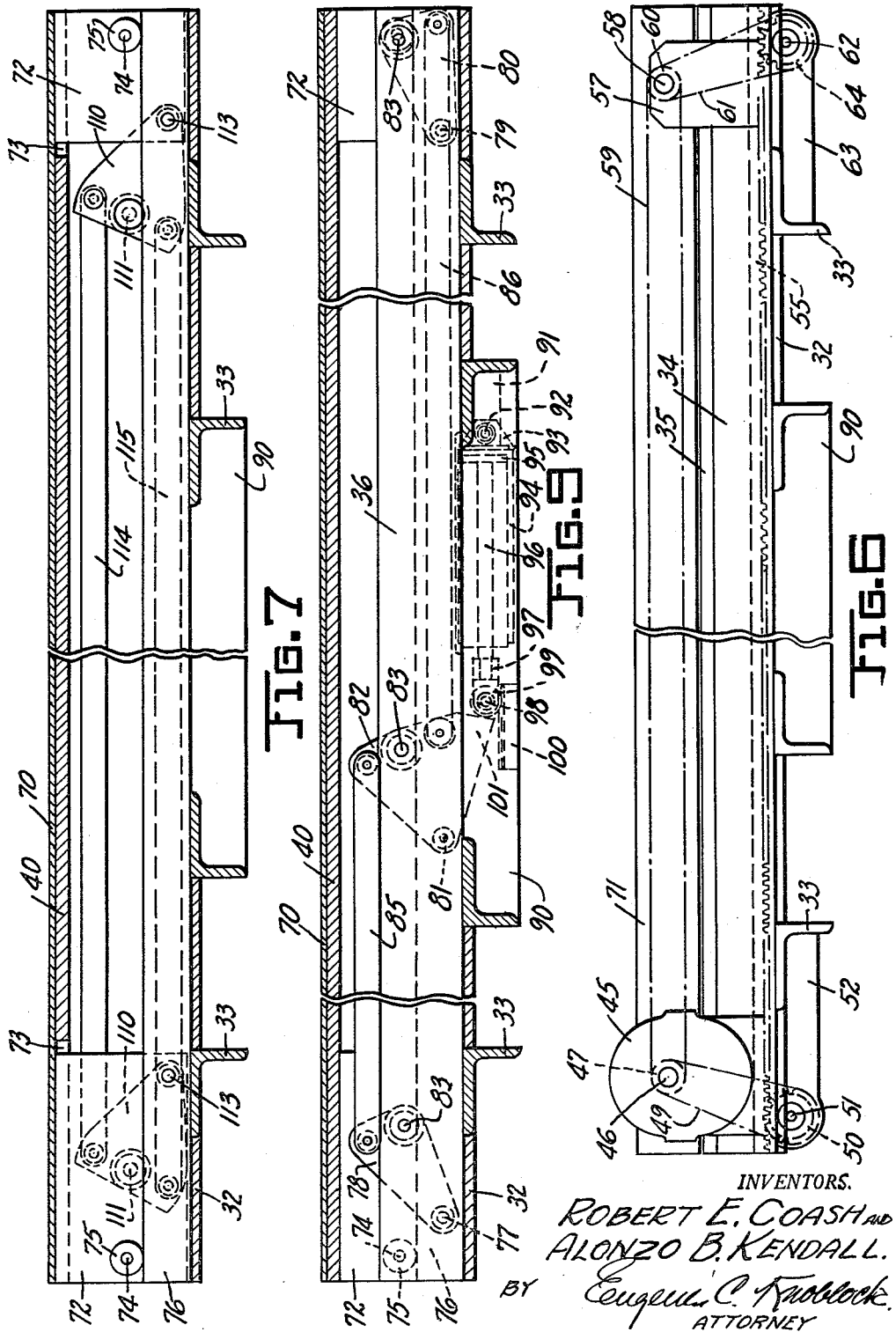

Aug. 21, 1962 R. E. COASH ET AL 3,050,205
LOAD SHIFTING DEVICE
Filed Dec. 30, 1954 6 Sheets-Sheet 6
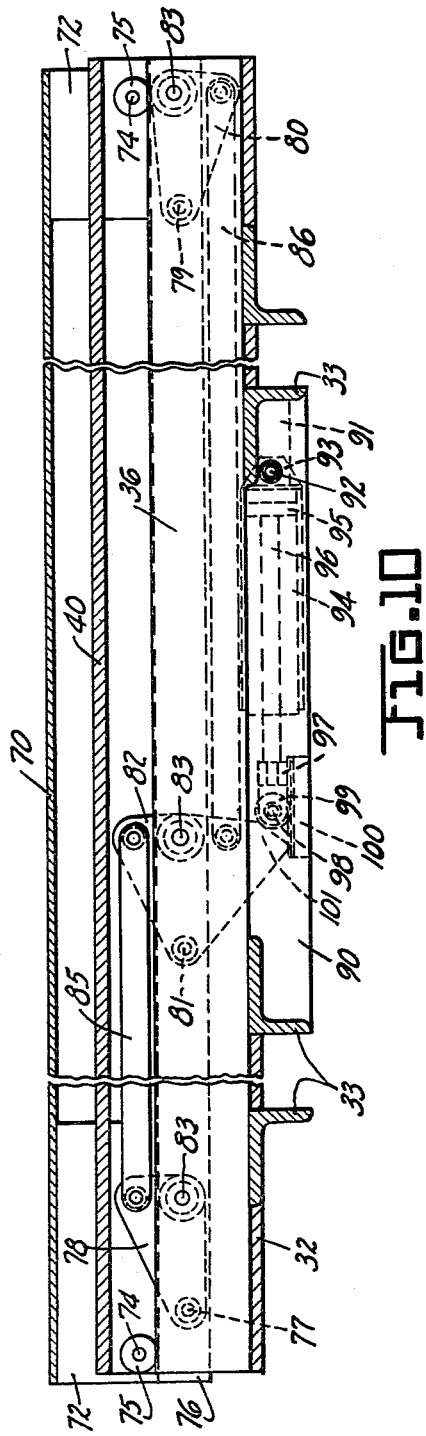
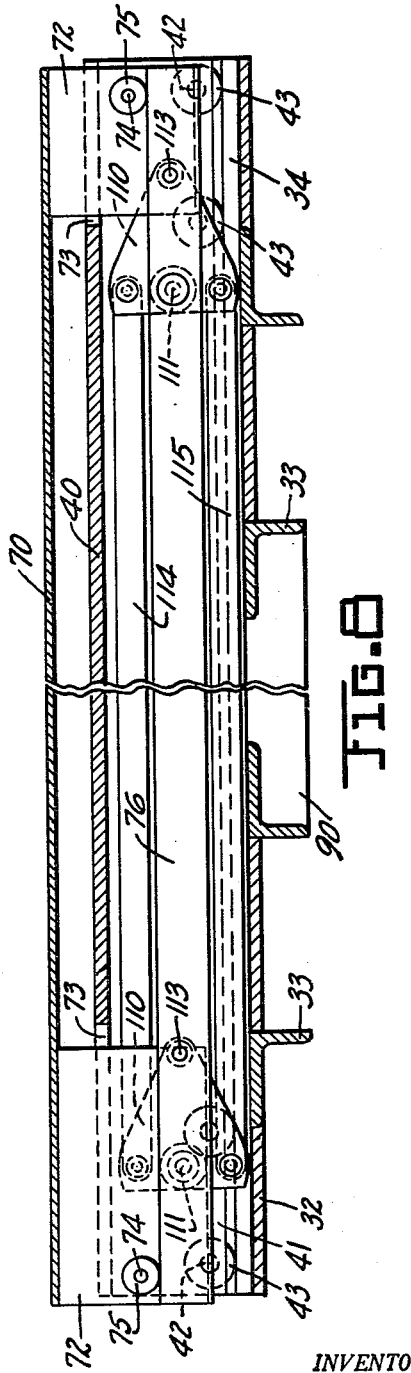
INVENTORS.
ROBERT E. COASH AND
ALONZO B. KENDALL.
BY Eugene C. Knoblock
ATTORNEY

United States Patent Office 3,050,205
Patented Aug. 21, 1962

3,050,205
LOAD SHIFTING DEVICE
Robert E. Coash, Kalamazoo, and Alonzo B. Kendall, Galesburg, Mich., assignors to Rack Specialists, Inc., South Bend, Ind., a corporation of Indiana
Filed Dec. 30, 1954, Ser. No. 478,836
11 Claims. (Cl. 214—514)

This invention relates to load shifting devices, and more particularly to a device for use upon a lift truck for mounting and carrying a load upon such truck and for discharging the load and picking up the load at a lateral position relative to the truck. This device is particularly related to and is an improvement upon the device covered by the patent application of Rowland L. Sylvester and Glenn N. Romine for load transfer means for lift trucks, Serial No. 401,478, filed December 31, 1953, Patent No. 2,804,218, dated August 27, 1957.

It is conventional practice in factories, warehouses and other locations, to mount multiple work pieces upon work carriers, such as pallets, skids and boxes, which are supported in elevated position relative to a supporting surface by means of uprights or legs, so as to enable the forks of a fork lift truck to engage thereunder. It is also the conventional practice to store work pieces mounted upon such work carriers in racks in what is known as selective storage. The use of fork lift trucks to pick up and transport the work carriers loaded with the work pieces from various locations to different destinations, as from storage to working machinery, or vice versa, is also common. Heretofore, however, it has been necessary to so locate racks, machines and the like, as to permit a fork lift truck to be maneuvered adjacent each location or storage space so that the forks which are to engage the work carrier move toward and away from said work carrier while approaching or after releasing a load. This requires wide aisles, with the result that a large proportion of the floor space of a building must remain empty so that percentage of utility of any given space may be quite small.

It is the primary object of this invention to provide a novel load-shifting means which may be mounted upon a fork lift truck and which is adapted to project laterally relative to said truck to pick up and discharge a load located alongside the fork lift truck.

A further object is to provide a load-shifting means adapted to be mounted upon a lift truck, which has a base unit adapted to have a fixed relation to the truck, a traverse unit adapted to shift laterally relative to the base unit, and an elevating unit carried by the traverse unit for raising and lowering a load relative to said traverse unit and base unit.

A further object is to provide a load-shifting device including a base unit and a laterally shiftable traverse unit powered by means adapted to be operated selectively in either of two directions, so that a load may be picked up and discharged as desired at either side of a truck mounting the device.

A further object is to provide a load-shifting device of this character having a base unit, a traverse unit shiftable laterally relative to said base unit, and an elevating unit shiftable vertically relative to said traverse unit, together with means for stabilizing the elevating unit at all times that the same is projected laterally relative to the base unit.

A further object is to provide a load-shifting device of this character having a base unit and a laterally shiftable traverse unit, wherein means are provided for lowering a supporting structure at the leading end of the traverse unit as the same is moved laterally clear of the base unit.

Other objects will be apparent from the following specification.

In the drawings:

FIG. 2 is a fragmentary top view of the device with parts broken away;

FIG. 3 is an end view of the device in one operative position thereof;

FIG. 4 is a fragmentary end view of the device in another operative position thereof;

FIG. 5 is an end view illustrating a drive mechanism forming a part of the device;

FIG. 6 is a side view of the drive mechanism;

FIG. 7 is a vertical sectional view taken on line 7—7 of FIG. 3 and illustrating the parts in lowered position;

FIG. 8 is a sectional view taken on line 7—7 of FIG. 3 and illustrating the parts in elevated position;

FIG. 9 is a vertical sectional view taken on line 9—9 of FIG. 3 and illustrating the parts in lowered position;

FIG. 10 is a vertical sectional view taken on line 9—9 of FIG. 3 and illustrating the parts in elevated position;

FIG. 11 is a vertical sectional view taken on line 11—11 of FIG. 3 with parts broken away and illustrating the parts in one operative position;

FIG. 12 is a fragmentary sectional view with parts broken away similar to FIG. 11 but illustrating the parts in a second operative position.

Figure 1:
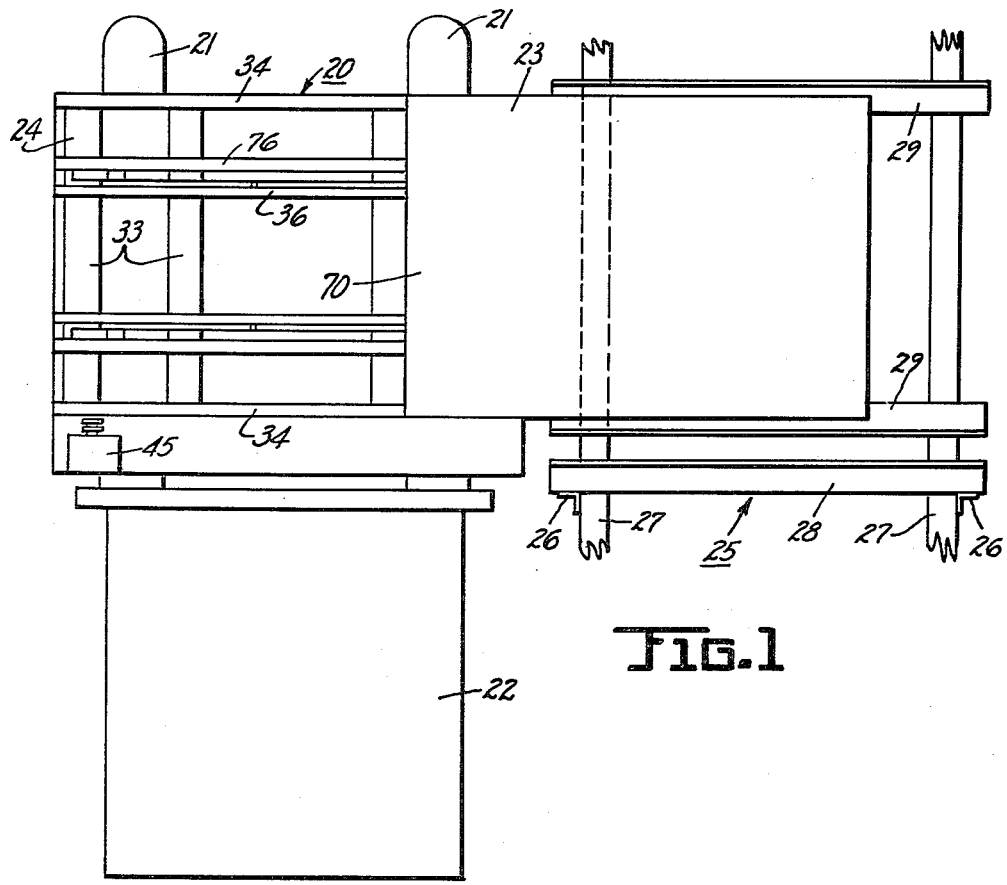
FIG. 1 is a schematic top plan view illustrating the device mounted upon a fork lift truck and in the act of transferring a load from one to the other of a storage rack and the device.

Referring to the drawings which illustrate the preferred embodiment of the invention, the numeral 20 designates our new load-shifting mechanism mounted upon the fork arms 21 of a fork lift truck 22 of any conventional construction and illustrated schematically in FIG. 1. It will be understood that the fork lift truck will be of the type in which the forks 21 thereof project forwardly from the truck 22 which is of mobile character and which is provided with elevating means (not shown) by means of which the fork arms 21 may be raised and lowered by power-actuated mechanism associated with the truck 22 and under control of the operator. Fork lift trucks of this character are widely used in industry and commonly are powered by gasoline engines or electric motors and have associated therewith hydraulic pumps (not shown) and a hydraulic actuating mechanism by means of which various of the operating parts of the device, including the fork lift arms, may be operated or driven under the control of valves (not shown).

The numeral 25 designates a rack for the selective storage of goods therein at different levels. The rack 25 will preferably include upright supports 26, longitudinal stringers 27 carried by the supports 26 at different levels, transverse load-supporting members 28, and transverse track members 29.

Our new device 20 is so constructed as to be mounted or supported upon the fork arms 21 of the fork lift truck and to support a work carrier, such as a skid, a pallet or other work carrier of any of the types well known in the art. Our device includes a plurality of relatively shiftable parts or sections, one section 23 of which is shiftable between a position centered relative to a base or support 24 and a lateral position projected into a rack 25 or the like, as illustrated in FIG. 1, to shift or transfer the load between the rack and a transport position centered relative to the fork arms 21 and the fork lift truck.

The base portion 24 of our device includes a plate 32 having guide members 33 carried thereby and projecting therebelow and adapted to engage the fork arms 21 of the fork truck to position the plate 32 upon said fork arms 21 against sliding movement or displacement. As here shown, the members 33 constitute angleirons secured to and depending from the base plate 32 and arranged in spaced pairs of spaced members, the members of each pair being spaced apart a distance slightly greater than the width of the fork arms, and the pairs being spaced a distance equal to the spacing between the fork arms of a fork lift truck. The base will preferably be shorter than the fork arms 21 and will be wider than the spacing between said fork arms to overhang the same laterally, as seen in FIG. 1. A pair of track members 34, here shown as angleirons, are secured in spaced parallel relation to the top of the base 32. One of the track members 34 is preferably located at the foremost or outermost margin of the plate 32 and the other guide track 34 is preferably spaced inwardly from the opposite margin of the plate 32, as best seen in FIG. 5. The track members preferably include retainer plates or flanges 35 welded or otherwise fixedly secured to the angleirons 34 so as to cooperate therewith in defining a substantially C-shaped track. The plate 32 also mounts a pair of upright wall or rib members 36 between and parallel to track members 34 and preferably spaced from each other and substantially uniformly spaced from the track members 34.

The shiftable portion 23 of the device includes a traverse plate 40 which is provided with a pair of depending end flanges 41 of rigid construction welded or otherwise secured thereto adjacent the front and rear margins thereof. The plate 40 is of a length substantially equal to the spacing between the track members 34, and the depending flanges 41 are located parallel to and at the marginal portions of the plate 40 with their outer surfaces spaced apart a distance slightly less than the spacing between the inner edges of the track retainer plates 35, as best seen in FIG. 3. Each flange 41 carries a pair of spaced studs 42 adjacent each end thereof, said studs 42 being equispaced from the plate 40 and serving to journal rollers 43 which traverse the tracks 34 and are retained upon said tracks by the retainer plates 35. The vertical dimension of the flanges 41, together with the relation of the rollers 43 and the track 34 to the plate 32, is such that the traverse plate 40 is located above and has clearance with the upright walls 36 on the base member 32. As best seen in FIG. 8, at least two spaced rollers 43 are located at each end of each flange 41, with a roller adjacent each end of said wall 41 and a second roller spaced therefrom. The spacing between the rollers 43 at each end of each flange 41 will preferably be greater than the clearance space between the platform base 24 and the ends of rack members 29, as viewed in FIG. 1, as a driver of the fork truck moves the truck with its load centered thereon adjacent to the rack 25 for work transfer purposes. Thus a spacing of the adjacent rollers 43 in the order of from 4 to 12 inches is preferred.

Suitable means are provided for shifting the traverse plate 40, and such means are best illustrated in FIGS. 5 and 6. A motor 45 is mounted upon the rear or inner end of the base member 32 spaced from the innermost or rearmost track 34, as illustrated in FIG. 5. This motor will be a reversible motor and may operate by any suitable motive power. Thus the motor may be an electric motor or an hydraulic motor, and we prefer the latter. Suitable connections (not shown) will be effected between the motor 45 and the components of the fork lift truck, and such connections will include controls (not shown) which may be located adjacent to the controls for the fork lift truck so that the motor 45 may be operated by the truck operator rapidly and conveniently. The shaft 46 of the motor mounts a pair of drive-transmitting members, such as sprockets 47 and 48. The sprocket 47 drives a chain 49 which is trained around a sprocket 50 keyed or otherwise fixed on the shaft 51 suitably journaled by bearings carried by a pair of spaced plates 52, 53, as best seen in FIG 5, projecting below the plate 32.

A pinion 54 is mounted on the end of the shaft 51 and meshes with a rack 55 extending parallel to the track 34 and secured in fixed relation to traverse member 40 by a hanger 56, such as a plate depending from the traverse plate 40 between the depending members 41 of the traverse plate, as best seen in FIG. 5.

As illustrated in FIG. 6, the motor 45 is preferably located adjacent one side of the base plate. At the opposite side of the base plate spaced from the innermost track 34 is mounted a pair of spaced bracket members 57 which have journaled therebetween a shaft 58 carrying a sprocket aligned with the sprocket 48 and adapted to have trained therearound a chain 59 extending to and around the sprocket 48 so that rotation of the motor shaft 46 will rotate the shaft 58. A sprocket 60 is also mounted on shaft 58 and has a chain 61 trained therearound and extending to and around a sprocket mounted on a shaft 62 journaled in spaced plates 63 depending from the base plate 32 and spaced similarly to the spacing of the plates 52 and 53. Shaft 62 has a pinion 64 mounted at its inner end and adapted to engage a traverse rack 55.

In the operation of the portion of the device above described, the operator of the fork lift truck 22, having our improved apparatus 20 mounted thereon, will drive or guide the truck to a position substantially as illustrated in FIG. 1, alongside the rack 25, with the device opposite a selected section of that rack. The controls for the fork lift arms 21 will then be operated to raise or lower the same to position the base of the device 20 at substantially the same level as the rack members 29 of the selected tier. The operator has thus positioned the track members 34 of the base of the device in alignment with and at substantially the same level as the rack members 29. Thereupon the motor 45 is operated in a proper direction to cause movement of the traverse portion 23, 40 of the device toward the rack as viewed in FIGS. 1 and 6. In this operation both of the pinions 54 and 64 are rotated through their respective driving connections with the motor in synchronism and in the same direction, thereby causing movement of the upper or traverse portion of the device relative to the base plate 32 and toward the rack. As the movement occurs, the leading rollers 43 at the right-hand end of the traverse section as viewed in FIG. 8 will move clear of the tracks 34, but the second or inner rollers 43 at the leading end of the traverse unit will require movement over a substantial length of the tracks before disengaging the tracks. This extent of movement will be greater than is required for the leading rollers 43 to engage the rack members 29, so that, by the time the second rollers 43 leave the track 34, the leading end of the traverse unit will have been supported by the engagement of the leading rollers 43 with the rack members 29. Consequently, the traverse member will have support at both its leading and its trailing end at all times, and the transfer of the leading end of the traverse unit to the rack will occur readily. The driver will preferably drive as close to the rack unit as possible so that the lateral shifting of the traverse unit and the load carried thereby will not be sufficient to alter the transverse center of balance of the mechanism and the lift truck. In other words, load transfer from the fork lift truck to the rack will occur quickly before the fork lift truck and associated mechanism becomes unstable. After the leading rollers engage the rack, the weight will be distributed between the lift truck and the rack, and movement of the traverse unit may continue until the rollers 43 at the trailing end of the traverse unit take a position adjacent the right-hand fork 21 in the case of movement to the right, as illustrated in FIG. 1.

It will be apparent that the movement of the traverse unit by the motor 45 is effected by a positive drive at all times. Thus, although the rack 55 will disengage the pinion at its trailing end, assumed to be pinion 54 in the event of movement to the right as viewed in FIG. 1, a full driving connection is maintained because of the mesh of the pinion 64 with the rack and the positive drive of that pinion by the motor. If desired, safety devices may be incorporated in association with this drive mechanism to insure that the extent of movement of the traverse unit relative to the base plate 32 and the tracks 34 thereon may be limited, thereby insuring against displacement of the trailing rollers 43 from their tracks, against disengagement of the rack 55 with its drive mechanism, and more particularly insuring against a travel of the traverse unit to such an extent that the mechanism would not be supported in a stable position upon the fork lift truck. In this connection, as aforementioned, it is preferred that the limit of movement will be such that the rollers 43 at the trailing end will stop between the forks 21 or above the fork of the fork lift truck positioned nearest to the rack. Consequently, the device will not tend to tip laterally or otherwise become dislodged relative to the fork arms, or, in cases where sleeves or like means afford positive connection between the fork arms and the base 32, forces will not be applied which would tend to unbalance and tip the fork lift truck laterally.

The use of a reversible motor 45 permits operation of the device to shift the traverse unit either to right or to left, and also permits a positive drive both in advancing and retracting directions relative to a rack.

It may be mentioned in this connection that the unit will preferably be self-contained so that it may be supported upon the guide members 33 with the plate 32 in an elevated position when the device is not in use. Consequently, the device may be readily stored or placed in use by the simple expedient of maneuvering the fork lift truck and its fork arms relative thereto. Thus, assuming that the device is stored and is resting upon the guides 33, the fork lift truck may be driven in a direction parallel to the guides 33 with its forks 21 aligned with said guides so as to pass therein to operative position. Thereupon, operation of the fork lift mechanism will cause the fork arms 21 to pick up the device. Connections can then be made between the various components of the device and the source of power of the fork lift truck, such as electric batteries or high pressure fluid lines, and the device is ready for operation. Disconnection of the device from the fork lift truck is accomplished by a reverse procedure.

*Elevating and Stabilizing Units*

As previously mentioned, the work will be carried or supported by skids or pallets so that a number of work pieces may be handled as a unit. Such work carriers entail an elevated work-supporting platform or base with depending legs or flanges at its sides. My new construction must be capable of entering a rack in the manner illustrated in FIG. 1, and passing beneath the pallet platform and between the pallet legs. Thereupon, it must be capable of elevation or vertical expansion to engage and lift the pallet platform so that the legs are moved clear of engagement with the rack. This elevated condition must be maintained as the device is moved back to normal or retracted position on the fork lift truck, whereupon it may be retracted or collapsed to permit the legs of the pallet to rest upon the fork arms of the truck or upon the base 32 of the device. Means for raising or lowering the level of the work-engaging portion of the device is called the elevating means, and the means for holding the elevating means in a horizontal position are referred to as the stabilizing means.

A top plate 70 normally bears upon the traverse plate 40 and is of a dimension substantially coextensive with the traverse plate, as illustrated in FIG. 9, in a direction transverse of the fork arms and their associated guides 33, and is of greater length than the traverse plate 40 in a direction parallel to the fork guides 33, as illustrated in FIG. 3. Depending flanges 71 are formed at the fore and aft margins of the plate 70 and are of such depth as to terminate adjacent to the track part 35 in the collapsed position of the device, as illustrated in FIG. 3. Adjacent each end, the plate 70 has fixedly secured in depending relation therein a pair of spaced vertical plates 72 extending parallel to flanges 71 and spaced inwardly therefrom. The plates 72 are of a depth to terminate spaced above base plate 32 in the collapsed position of the parts, as seen in FIG. 3. The traverse plate 40 is provided with notches or openings 73 at its ends to receive the plates 72. Each plate 72 mounts a stud shaft 74 on which is journaled a roller 75. Stud shafts 74 and rollers 75 are preferably located adjacent the outer ends of the plates 72 and in similarly spaced relation to the plate 70, as seen in FIG. 7. In the normal or centered position of the parts, the rollers 75 bear upon elongated horizontal rail members 76, there being two such rail members 76, each positioned adjacent to and parallel to a plate 72 and spaced slightly from said plate 72 and positioned at the side thereof adjacent to the plate 36 on the base plate 32.

Each of the rails 76 extends substantially full width of the device, as seen in FIG. 7, that is, is of substantially the same width as the base plate 32 and the top plate 70. Each rail 76 is pivotally connected at spaced points along the length thereof to means for elevating and lowering the same. Thus the left-hand end of rail 76, as viewed in FIGS. 9 and 10, is pivotally connected at 77 to a bellcrank lever 78, is pivoted at 79 adjacent its right-hand end to a bellcrank lever 80, and is pivoted at 81 intermediate its ends to a bellcrank lever 82. Each of the bellcranks 78, 80 and 82 is pivoted at 83 to the adjacent upright plate 36 on the base plate 32, from which it is spaced by a spacer member 84 a predetermined distance. Each bellcrank 78 is pivotally connected to the bellcrank 82 by an elongated substantially horizontal rigid link 85. Each bellcrank 80 is pivotally connected to the bellcrank 82 by an elongated rigid substantially horizontal link 86. The bellcranks are so constructed that the spacing between rail pivots 77, 79 and 81, respectively, thereof, are equispaced from the bellcrank pivot axes 83. Similarly, the spacing between the pivots 83 and the points of pivotal connection of the links 85 and 86 are equal. Consequently, if pivotal movement of any one of the bellcranks occurs, the other two bellcranks pivot equally and in the same direction, and, therefore, pivotal movement of the bellcranks raises the tracks 76 while maintaining true horizontal positioning thereof. In this connection it will be observed that the links 85 and 86 are located at opposite sides of the pivot axis 83 of the bellcrank 82.

The base plate 32 mounts in depending relation, as between the innermost guide members 33, structural members 90 which may be spaced pairs of spaced angleirons, as illustrated in FIG. 4, or any other structural units. These structural members 90 are located adjacent to and preferably extend parallel to the upright plates 36 on the base 32. Blocks 91 are carried by the members 90, and a transverse shaft 92 extends between blocks 91. Tongue or flange portions 93 of cylinders 94 are pivotally connected to the shaft 92. As here shown, two cylinders 94 are preferably arranged side by side between each pair of members 90 in order to give required capacity while holding the diameters of the cylinders to a minimum. If desired, one or more than two cylinders may be employed. The cylinders will be of the well known hydraulic actuated type, each having a piston and being adapted for connection with a pump (not shown) or other source of liquid pressure, preferably mounted upon and forming a part of the fork truck 22, as well understood in the art. Pistons 95 of the power members mount piston rods 96 carrying yokes or heads 97 connected by a shaft 98 which mounts rollers 99 traversing a guide plate 100 supported by and extending between the members 90. The central bellcrank 82 has a depending portion 101 projecting into the path of rollers 99 to be engaged thereby, whereby said bellcrank 82 may be shifted from the position shown in FIG. 9 to the position shown in FIG. 10 incident to the operation of the power cylinders 94. It will be understood that two sets of power cylinders will be provided, as best seen at the bottom in FIG. 3, so that the bellcranks 82 at each side of the device will be separately or individually actuated, and said power elements will be similar in construction and have equal strokes and will be similarly oriented to the bellcranks 82 so that the angular movements of the two bellcranks 82 will be equal upon each actuation thereof.

The operation of the elevating means will be readily apparent from the foregoing and entails energization of the power cylinders or other power members 94 to shift the rollers 99 which move in a plane common to the plane of the intermediate bell crank 82 and, therefore, shift said bellcrank from the rest position thereof, illustrated in FIG. 9, wherein the top plate 70 rests upon the traverse plate 40, to the position illustrated in FIG. 10. Pivoting of each bellcrank 82 about its center 83 produces an equal pulling force upon each of the links 85 and 86 so as to cause pivoting of the bellcranks 78 and 80 through the same angular stroke or throw as the bellcrank 82. The pivoting of the bellcranks 78, 80 and 82 produces equal upward swinging movement of the pivots 77, 79 and 81 to which the rails 76 are pivoted, thereby bodily upwardly moving the rails 76 an equal amount of maintaining the same in true horizontal position. Since the rollers 75 bear upon the tracks 76, the upward movement of the tracks 76 raises the rollers 75 and the depending plates 72 carried by the top plate 70, whereby the top plate 70 is elevated to the FIG. 10 position. The power members 94 will preferably be single acting and will rely upon the weight of the load and of the plate 70 and associated parts to restore the elevating means to the FIG. 9 position upon release of pressure from the power cylinders 94.

Since the rails 76 shift only in a vertical direction relative to the base plate 32, or in a motion having only a small horizontal component, whereas the top plate 70 is carried sidewise relative to the base plate 32 by the traverse member 40 as explained above, it will be apparent that whenever the plates 40 and 70 are displaced from a centered or superimposed relation to the plate 32, the rollers 75 at the projected end of the device will move clear of the rails 76, leaving only the rollers 75 at the trailing end of the traverse unit in engagement with and adapted to run along the rails 76. The position of the traverse unit when laterally projected remains substantially horizontal by reason of the engagement of the rollers 43 with the rack parts 29, as explained previously, but this is not sufficient to insure the continued horizontal positioning of the top plate 70 after the rollers 75 at the leading end thereof disengage the rails 76. Accordingly, it is necessary to provide stabilizing means which will accomplish the maintenance of the horizontal position of the top plate 70 when elevated, as illustrated in FIG. 10.

We have provided stabilizing means which are best illustrated in FIGS. 7 and 8, and which include bellcrank members 110, which are four in number, two being located adjacent each side of the device and being aligned with similar members at the opposite side of the device. The bellcrank members 110 are pivoted at 111 intermediate the height thereof, to the depending members 41 at the forward and inner ends of the traverse plate 40, and preferably are associated with suitable spacer means 112 for governing the position or spacing thereof relative to the members 41. The bellcrank members are preferably substantially triangular in form, and the pivot axes 111 are located adjacent one end thereof at a point midheight thereof. Pivot pins 113 are located at the opposite ends of the bellcranks and are journaled to the adjacent plates 72. Consequently, as the rails 76 are raised and lowered, as explained above, the bellcranks 110 are pivoted from the rest position illustrated in FIG. 7, to the elevated position illustrated in FIG. 8. Tension links 114 extend horizontally and are pivotally connected at opposite ends to the upper end portions of coplanar bellcranks 110 at opposite sides of the device, and similar tension links 115 are pivotally connected at their opposite ends to the lower portions of the bellcranks 110. The spacings of the pivot centers of links 114 and 115 relative to the pivot axis 111 of the bellcrank members 110 are equal and, consequently, a uniform and balanced relationship of the parts exists.

From the foregoing it will be apparent that the elevated position of one end of the top plate 70, determined by the engagement of its roller 75 with one end of the rail 76, will be transmitted through the linkage 114—115 and bellcranks 110 to the opposite end of plate 70 even though the rollers 75 at the opposite end are disengaged from the rails 76. Thus the elevation of the plate 70 and 72 resulting from engagement of the roller 75 with the rail 76 at one end results in elevation of the pivot axis 113 of the bellcrank 110 at the corresponding end or side of the device. The pivoting of the bellcrank 110 at the elevated side results in transmission of similar and equal pivotal movement to the bellcrank 110 at the opposite side which is free of support by the associated roller 75. The bellcranks 110 transmit this movement, translated from rotative to vertical movement at the pivot 113, to the plate 72 at the projecting end of the member 70 and thus maintain the plate 70 at a true horizontal position even though the rollers at one side or end thereof have left the track 76 which normally supports the same. It is evident from the foregoing that the plate 70 may be elevated and lowered at will, regardless of the position of the traverse unit 40 relative to the base plate 32. In other words, the mechanism will operate to elevate the plate 70 when the parts are superimposed, as illustrated in FIGS. 8 and 10, or when laterally projected, as illustrated in FIG. 1. In each instance parallelogram action occurs as between the base member, links 85, 86, bellcranks 78, 80 and 82, the supporting rails 76 to insure the horizontal positioning of those rails 76 in all adjustments of the elevating mechanism. A second parallelogram, including the bellcranks 110 and the links 114 and 115, operates to effect stabilization of the position of the plate 70 in horizontal relation at all times. It is interesting to observe in this connection that when a lifting operation is desired after the traverse member has been projected into a rack, the elevating operation entails the elevation of the rails 76 which is directly transmitted through the rollers 75 at the trailing end only of the plate 70. Nevertheless, the elevation of that trailing end energizes the adjacent bellcrank 110, and through the links 114 and 115 an equal energization of the other bellcranks 110 at the projecting unsupported ends of the traverse structure is produced, whereby a direct upward lift is transmitted to the plates 72 at the leading end of the top plate 70 whose rollers 75 are free of the track 76.

*Low Level Support Mechanism*

The mechanism heretofore described is operative and effective for the purpose of shifting a load laterally between a support, such as a rack, and a mobile support, such as a fork lift truck, that is, in any condition in which the work carrier, such as the pallet or skid, is located at a level above the level of the floor which the fork lift truck travels upon. The lowest level at which the device aforementioned will operate is a level at least as high as the level of the plate 32 at such time as the device is resting upon the floor, as upon complete lowering of the lift arm forks. In other words, the base or legs of the pallet must be spaced above floor level at least a distance equal to the spacing between the bottom edges of guides 33 and the top of the plate 32, or the top of the track 34. Consequently, in cases where a pallet or skid rests upon the floor, it is not possible for the device to operate because there is no track member, such as the rack member 29, at the same level as the tracks 34 on which the rollers 43 may travel as the device is shifted laterally to pass under the pallet or other work carrier. Since this limits the utility of the device, it is desirable to provide mechanism which will operate efficiently to support the device in projected position to pass below a pallet resting upon the floor. Mechanism of this character is illustrated in FIGS. 3, 11, 12 and 13.

The traverse plate 40 has a pair of rigid fixed structural members, such as angleirons 120, fixedly carried thereby and depending therefrom in spaced relation to each other and extending parallel to and slightly inwardly spaced from the upright members 36 on the base 32. The portions of the base member 32 below and between the members 120 extending outwardly from the outermost fork guide 33 is cut away at 121. As best seen in FIG. 11, the structural members 120 extend only for a short distance at each side of the device from adjacent the fork guides 33 outwardly to terminate spaced from the side edges of the structure. Pins 122 are located at the lower inner corners of the members 120, and each pivotally mounts one end portion of one of a pair of short toggle links 123. The free ends of adjacent toggle links are connected by a shaft 124 upon which is journaled a roller 125, there being two rollers located at opposite ends or sides of the device, as seen in FIG. 11. The normal relation of the parts is that illustrated in FIG. 11, from which it will be seen that the rollers 125 project through the openings 121 in the base adjacent to and outwardly of the fork guides 33. Longer toggle links 126 are pivoted at their lower ends to the roller shaft 124, and each is pivotally connected at its upper end to a slide member 127 which travels between guide members 128 and 129 carried by the structural members 120 and extending horizontally. The slide 127 is preferably notched at 130 adjacent its outer end.

A bracket 131 is carried by the traverse plate 40 adjacent the outer ends of each pair of frame members 120, there preferably being two such brackets 131 arranged in alignment at each side of the device and serving to journal therebetween a rod or shaft 132. A hook member 133 projects inwardly from each shaft 132 and, in the normal position of the parts as illustrated in FIG. 11, is adapted to seat in the groove 130 of the slide 127. The slides 127 at opposite sides of the device are connected in predetermined spaced relation by a rigid link 127'. By this arrangement of the parts, the hooks 133 and associated parts serve normally to hold the rollers 125 in the centered position shown in FIG. 11, each acting to restrain or prevent inward sliding of the associated slide 127.

A finger or lever 134 projects downwardly and inwardly from each rock shaft 132. The arrangement is such that both the hook 133 and the finger 134 are fixed relative to the rock shaft 132 to swing bodily upon rotation of such shaft. The swinging unit is urged to the position illustrated in FIGS. 11 and 13 by a spring 135 anchored at one end to a member 136 carried by the traverse plate 40 and anchored at 137 at its opposite end to the hook 133 spaced from the rock shaft 132. Consequently, in the position illustrated in FIGS. 11 and 13, the hook 133 is urged by the spring into engagement with the notch 130 of the slide 127. The stop shoulder or stop means associated with one of the parts 130, 132, 134 and adapted to engage the bracket 131 limits swinging of the parts 133 and 134 in a clockwise direction from the position shown in FIG. 13.

Figure 13:
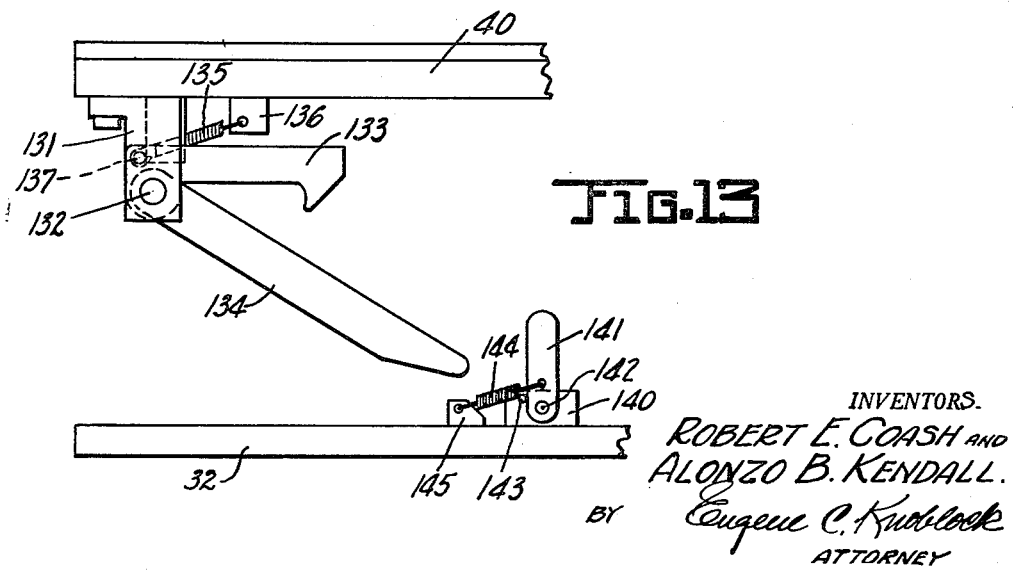
FIG. 13 is a detail view illustrating the construction of the latch mechanism associated with the mechanism illustrated in FIGS. 11 and 12.

The base plate 32 has a bracket 140 adjacent the lower free end of each finger 134 in the normal position of the parts. A trip member 141 is pivoted at 142 to the bracket 140. The trip member is preferably elongated and has a rounded upper end, the same being normally positioned substantially vertically, as illustrated in FIG. 13, bearing against a stop 143 carried by the bracket 140. A spring 144 connects the trip member 141 with the bracket 145 carried by the base 32 and normally urges the trip 141 into an upright position bearing against the stop pin 143. The trip member 141 is located in the path of movement of the finger 134 and projects to a level spaced above the lower tip of the finger 134 in its normal position.

The operation of the mechanism associated with the rollers 125 is substantially as follows, assuming that movement of the traverse member relative to the base 32 is to occur toward the left as illustrated in FIG. 11. As the traverse member moves from the FIG. 11 position, the right-hand roller 125 comes into engagement with the inner end of the slot 121 in which it is positioned. Consequently, continued movement of the traverse member toward the left causes the right-hand roller 125 to roll upwardly onto the top surface of the base plate 32. This action entails elongation of the right-hand toggle links 123, 126 with resultant movement of the slide 127 at the right or trailing end outwardly in the guide track between the guide members 128 and 129, thus disengaging the right-hand hook 133 from the notch 130 in the right-hand slide 137. The fully extended position of the trailing toggle is illustrated at the right in FIG. 12, wherein it will be seen that the trailing slide 127 has moved outwardly to such an extent that the hook 133 has engaged the innermost end of the slide and holds the same in extended position. It will also be observed that the finger 134 at the trailing end of the device has passed the trip member 141 at the right-hand or trailing end of the structure as accommodated by pivoting of that trip member against the action of its spring 144. The movement of the trailing slide 127 toward the right or the rear or trailing direction has entailed a movement relative to the transverse member 40. This movement of transmitted by the link 127' to the slide 127 at the leading end of the unit, thereby moving said leading slide 127 inwardly or rearwardly, that is, toward the right, from the position illustrated in FIG. 11 to that illustrated in FIG. 12. The latch 133 at the leading end cams itself from the notch 130 to be released and to accommodate folding of the leading toggle. The folding of the leading toggle members 123 and 126, which results from rearward movement of the leading slide 127, serves to swing the leading toggle arm 123 downwardly and to lower the roller 125 at the leading end of the device to an extent substantially flush with the lowermost surfaces of the guides 33 and associated parts. Consequently, as the traverse member 40 shifts laterally from the base 32, the roller 125 at its leading end is lowered to a supporting position, and the leading end of the traverse member is thereby supported upon said roller, assuming that the level of the device is such that the roller may contact the floor or other supporting surface on which the guides 33 bear. The leading roller 125 is held in this lowered load-supporting position by the engagement of the hook 133 with the slide 127 at the trailing end of the structure as mentioned previously, and this relationship continues, both during outward projection of the traverse member relative to the base member 32 and upon its retraction, until such time as the parts approach the superimposed or registering relation illustrated in FIG. 11. Upon the return movement of the traverse member, for example, upon movement of the parts from FIG. 12 position toward the right, the right depending finger 134 then leading will engage the trip member 141 which is prevented from swinging toward the right with the finger 134 by the stop pin 143. Thus the leading finger 134 is cammed or swung bodily in an upward direction to pass over the trip member 141 and transmits its bodily movement through the rock shaft 132 to the hook 133 to disengage the hook 133 from the right-hand slide 127 which has heretofore served through its connection with the other slide 127 of link 127' to hold the left roller 125 in the lowered position shown. Before the free or lower end of the finger 134 passes the trip member 141, the right-hand roller 125, which previously has been elevated to ride upon the top surface of the plate 32, will reach the notch 121 and will be lowered therein, with the result that the right-hand slide 127 will be shifted toward the left and clear of the nose of the hook 133. During the final movement of the traverse member toward the registering position shown in FIG. 11, slides 127 will shift themselves to the balanced position illustrated in FIG. 11 incident to the operation of balancing of the weight and position of the parts. It will be understood that release of the lowered roller 125 from the FIG. 12 position will not occur until the rollers 43, or at least one thereof at the projecting end of the traverse unit have reached the track 34 to secure support for the final movement of the traverse member to centered or normal position.

While the preferred embodiment of the invention has been illustrated and described herein, it will be understood that changes in the construction may be made within the scope of the appended claims without departing from the spirit of the invention.

We claim:

1. A load-shifting device adapted to be mounted on a support, comprising a base unit having spaced guide tracks, a traverse unit mounting rollers guided by said tracks, a reversible motor carried by said base unit, means driven by said motor for shifting said traverse unit in selected direction from a centered position on said base unit and including a rack and pinion, a load carrier shiftably carried by said traverse unit, means for elevating and lowering said carrier relative to said traverse unit, said elevating means including a plurality of similar spaced bellcranks pivoted to said base and each having a pivotal connection with a bodily shiftable rail, rollers supporting said carrier and bearing on said rails, and means for simultaneously and equally actuating said bellcranks to shift said carrier.

2. A load-shifting device adapted to be mounted on a support, comprising a base unit having spaced guide tracks, a traverse unit mounting rollers guided by said tracks, a reversible motor carried by said base unit, means driven by said motor for shifting said traverse unit in selected direction on said base unit and including a rack and pinion, a loading-supporting member shiftably carried by said traverse unit, means for elevating and lowering said member relative to said traverse unit, said elevating means including a plurality of similar spaced bellcranks pivoted to said base and each having a pivotal connection with a bodily shiftable rail, rollers supporting said member and bearing on said rails, and means for simultaneously and equally actuating said bellcranks to shift said platform, said bellcranks being arranged in pairs, a third bellcrank pivoted to said base unit between each pair, and links connecting the bellcranks of each pair with said third bellcrank.

3. A load-shifting device adapted to be mounted on a support, comprising a base unit having spaced guide tracks, a traverse unit mounting rollers guided by said tracks, a reversible motor carried by said base unit, means driven by said motor for shifting said traverse unit in selected direction on said base unit and including a rack and pinion, a load-supporting member shiftably carried by said traverse unit, means for elevating and lowering said member relative to said traverse unit, said elevating means including a plurality of similar spaced bellcranks pivoted to said base and each having a pivotal connection with a bodily shiftable rail, rollers mounting said members and bearing on said rails, and means for simultaneously and equally actuating said bellcranks to shift said platform, one bellcrank having a projecting portion, said actuating means including a reciprocating member engaging said projecting portion to pivot said bellcrank.

4. A load-shifting device comprising a base unit, a traverse unit shiftably supported by said base unit, means for shifting said traverse unit laterally on said base unit, a load-supporting member carried by said traverse unit, means on said base unit for raising and lowering said member relative to said traverse unit, and means cooperating with said last named means for maintaining said member in selected angular relation to said base unit when elevated and laterally extended relative to said base unit, said elevating means including elongated horizontal rails extending parallel to the direction of movement of said traverse unit, means on said base unit for supporting said rails at selected elevation, and rollers on said member bearing on said rails.

5. A load-shifting device comprising a base unit, a traverse unit shiftably supported by said base unit, means for laterally shifting said traverse unit in selected direction on said base unit, a load-supporting member, means on said base unit for raising and lowering said member, two pairs of spaced bellcrank members pivoted to said traverse member, each pivoted bellcrank member being pivoted to said load supporting member spaced a predetermined distance from the pivot connection thereof with said traverse member, and two links extending between and pivoted to the pivoted bellcrank members of each pair at opposite sides of the pivot connection thereof with said traverse unit.

6. A load-shifting device comprising a base unit, a traverse unit laterally shiftable on and supported by said base unit, means for shifting said traverse unit in selected direction in a fixed path on said base unit, a load-supporting member carried by said traverse unit, means on said base unit for raising and lowering said member relative to said traverse unit, including two similar parallel parallelogram units each having a rail adapted to be traversed by rollers on said member.

7. A load-shifting device comprising a base unit, a traverse unit shiftably supported by said base unit, means for shifting said traverse unit on said base unit, a load-supporting member, means on said base unit for raising and lowering said member, including two similar parallel parallelogram units each having a rail adapted to be traversed by rollers on said member, and stabilizing means interconnecting said traverse unit and member to equalize lift forces at leading and trailing ends of said member when said traverse unit is displaced laterally relative to said base unit.

8. A load-shifting device comprising a base unit, a traverse unit shiftably supported by said base unit, means for shifting said traverse unit on said base unit, a load-supporting member, means on said base unit for raising and lowering said member, including two similar parallel parallelogram units each having a rail adapted to be traversed by rollers on said member, and two additional similar parallelogram units interconnecting said traverse unit and member and extending parallel to said first parallelogram unit.

9. A device for transporting a load and transferring the same to and from a rack having different storage levels, comprising a dirigible self-propelled vehicle, a power actuated load-supporting portion vertically shiftable on said vehicle, a transverse guide on said supporting portion, a traverse unit shiftable on and supported on said guide, and means for shifting said traverse unit on said guide to and from said rack, a load carrier carried by said traverse unit, means on said guide for raising and lowering the end portion of said carrier adjacent to said guide relative to said traverse unit, and means for similarly and equally elevating the opposite end portion of said carrier projected beyond said guide and a vertically shiftable wheeled supporting unit at each end of said traverse unit, and means responsive to the position of the traverse member on said guide for lowering the wheeled supporting unit at the leading end of said traverse unit as the same moves from normal to laterally extended position and for elevating the wheeled supporting unit as the traverse unit returns from extended position to normal position.

10. A device for transporting a load and transferring the same to and from a rack having different storage levels, comprising a dirigible self-propelled vehicle, a power actuated load-supporting portion vertically shiftable on said vehicle, a transverse guide on said supporting portion, a traverse unit shiftably supported on said guide, means for shifting said traverse unit to and from a centered position on said guide in either direction relative to said vehicle, a load carrier, means on said guide for raising and lowering the portion of said carrier on said guide including horizontal rails vertically shiftable on said guide and traversed by said traverse unit, and parallelogram means connecting said traverse unit and carrier for raising and lowering the portion of said carrier projecting from said guide simultaneously with raising and lowering of said rails.

11. A device for transporting a load and transferring the same to and from a rack having different storage levels, comprising a dirigible self-propelled vehicle, a power actuated load-supporting portion vertically shiftable on said vehicle, a transverse guide on said supporting portion, a traverse unit shiftably supported on said guide, means for shifting said traverse unit on said guide to and from said rack, a load carrier, means on said guide for raising and lowering said carrier and including two sets of links and pivoted members, one of said sets connecting said guide and a pair of horizontal rails to define a parallelogram and the other set connecting said rails and said carrier to define a second parallelogram.

References Cited in the file of this patent

UNITED STATES PATENTS

| | | | |
|---|---|---|---|
| 1,128,626 | Rikert | Feb. 16, | 1915 |
| 1,761,996 | Stevenson | June 3, | 1930 |
| 1,824,201 | Eisenberg | Sept. 22, | 1931 |
| 1,869,046 | Buck | July 26, | 1932 |
| 2,168,527 | Iversen | Aug. 8, | 1939 |
| 2,584,240 | Stewart | Feb. 5, | 1952 |
| 2,626,065 | Sanders et al. | Jan. 20, | 1953 |
| 2,652,938 | Murphy | Sept. 22, | 1953 |
| 2,667,980 | Dawson | Feb. 2, | 1954 |
| 2,699,878 | Avery | Jan. 18, | 1955 |
| 2,707,054 | Alimanestiano | Apr. 26, | 1955 |
| 2,777,586 | Boysen et al. | Jan. 15, | 1957 |
| 2,804,218 | Sylvester et al. | Aug. 27, | 1957 |

FOREIGN PATENTS

| | | | |
|---|---|---|---|
| 504,211 | Germany | Aug. 1, | 1930 |